Figures 3A, 3B:
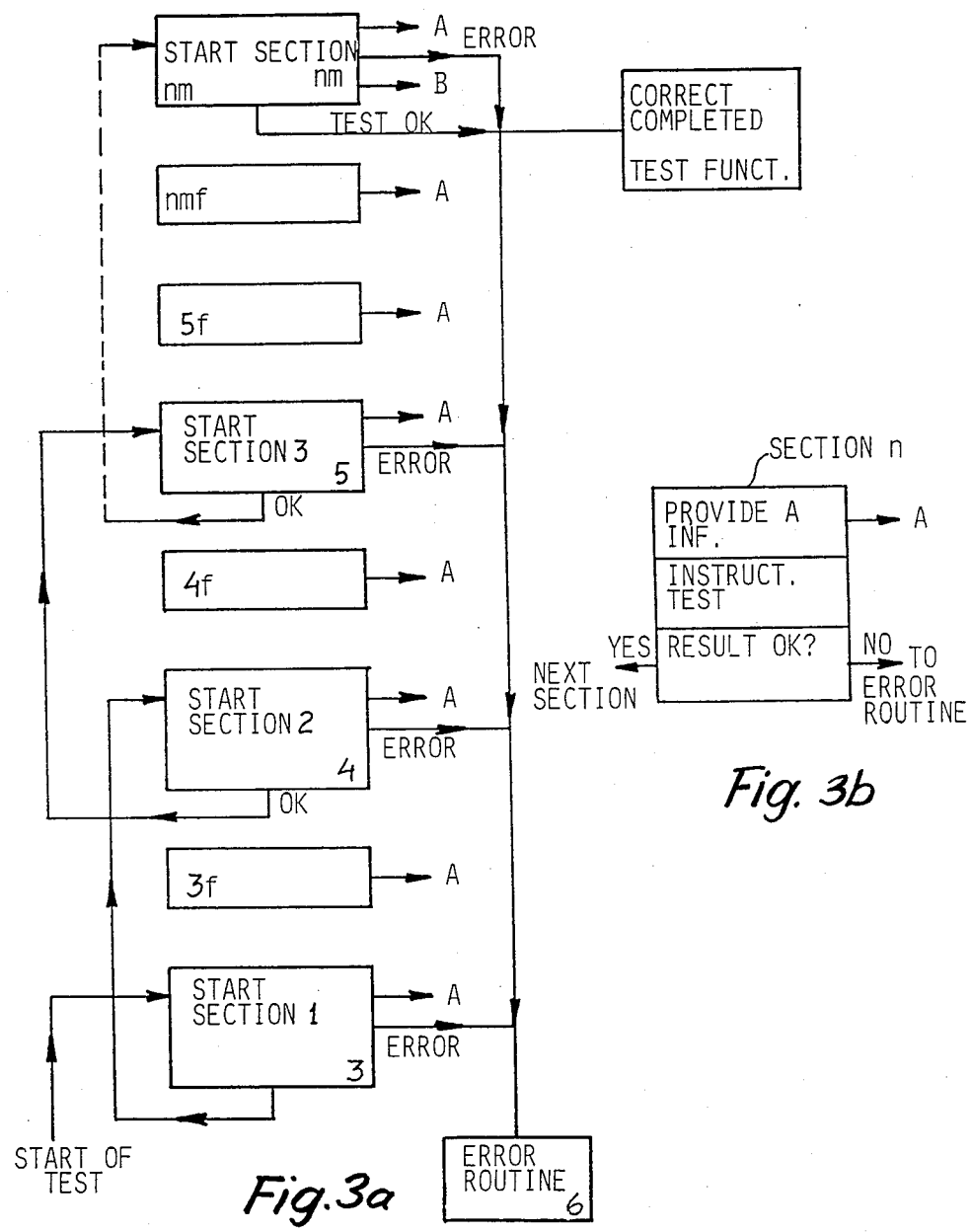

United States Patent [19]

Maaløe et al.

[11] Patent Number: 4,813,042
[45] Date of Patent: Mar. 14, 1989

[54] PROCESS FOR MONITORING A DATA PROCESSING UNIT AND A SYSTEM FOR PERFORMING THE PROCESS

[75] Inventors: Jens Maaløe, Værlose; Rudolf Budinka, Lyngby; Svend V. Andersen, Hillerod, all of Denmark

[73] Assignee: Aktieselskabet Nordiske Kabel-OG Traadfabriker, Frederiksberg, Denmark

[21] Appl. No.: 12,058

[22] PCT Filed: Apr. 28, 1986

[86] PCT No.: PCT/DK86/00043
§ 371 Date: Feb. 9, 1987
§ 102(e) Date: Feb. 9, 1987

[87] PCT Pub. No.: WO86/06520
PCT Pub. Date: Nov. 6, 1986

[30] Foreign Application Priority Data

Apr. 29, 1985 [DK] Denmark .............................. 1907/85

[51] Int. Cl.⁴ ...................... G06F 11/22; G06F 11/30
[52] U.S. Cl. ............................................. 371/16; 371/67
[58] Field of Search .................. 371/15, 16, 25, 67; 324/73 R, 73 AT; 364/200, 900

[56] References Cited

U.S. PATENT DOCUMENTS 4,594,685 6/1986 Owens .............................. 371/16 X
4,679,195 7/1987 Dewey .............................. 371/16 X Primary Examiner—Jerry Smith
Assistant Examiner—Robert W. Beausoliel
Attorney, Agent, or Firm—Ladas & Parry

[57] ABSTRACT

A data processing unit monitoring device produces a first type of information and a second type of information in a data processing unit. A first troubleshooting device external to the data processing unit has a sequence network for producing a third type of information in response to receipt of the first type of information from the data processing unit a plurality of times. The third type of information is then transferred to a comparator for comparing the third type of information with other, predetermined information in response to receipt of the second type of information from the data processing unit, whereby to perform a test function. A process for monitoring a data processing unit thus produces a first type of information and a second type of information in a data processing unit for a test thereof. A sequence network external to the data processing unit is updated with the first type of information a plurality of times to provide a third type of information, and the third type of information and other, predetermined information are compared in response to the second type of information for monitoring the data processing unit.

10 Claims, 5 Drawing Sheets

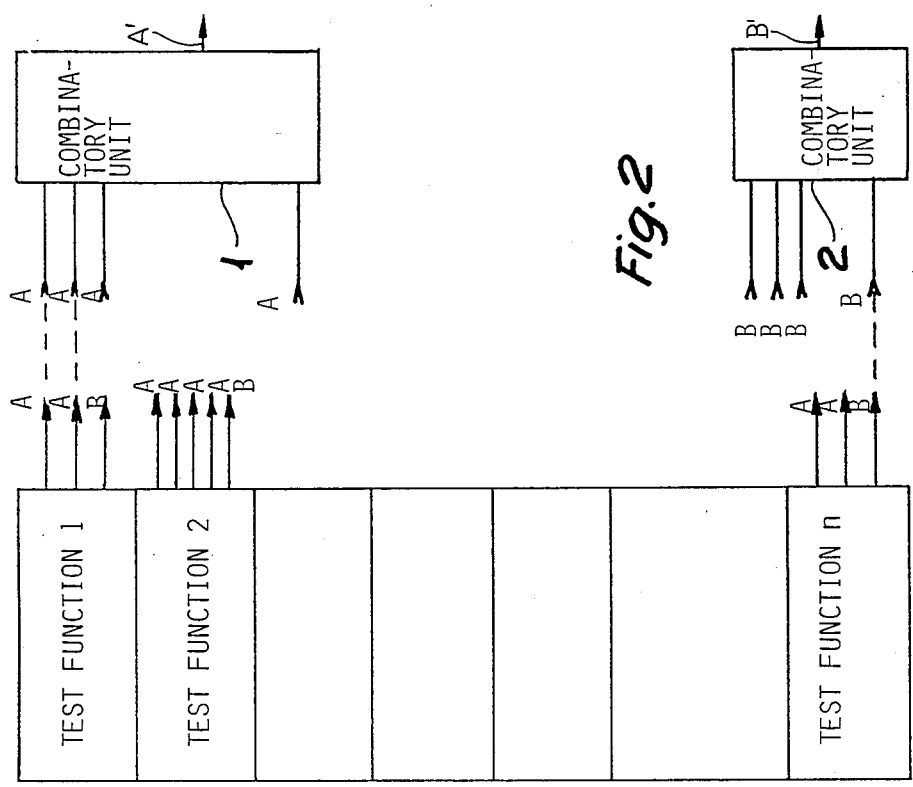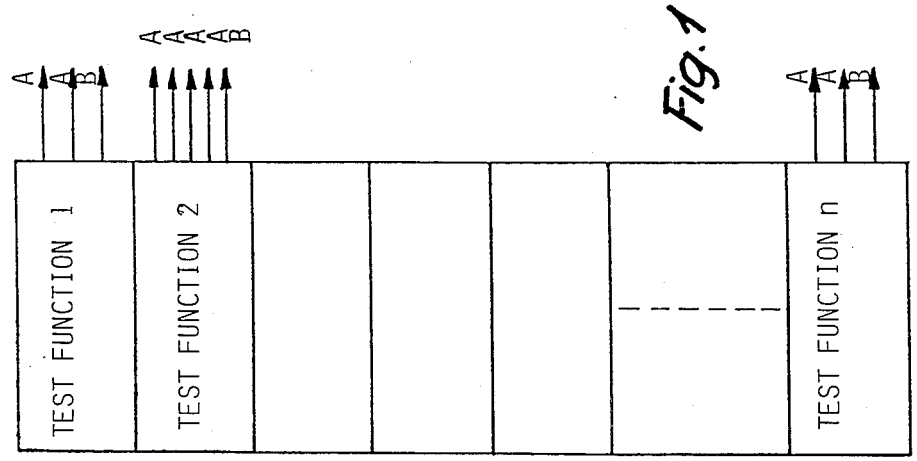

PROCESS FOR MONITORING A DATA PROCESSING UNIT AND A SYSTEM FOR PERFORMING THE PROCESS

The invention concerns a process for monitoring a data processing unit, preferably in connection with the execution of test functions to verify the instruction set of the unit, wherein partly a first type of information and partly a second type of information is provided. In particular, the invention relates to detection of errors in the micro instruction set with a view to obtaining a practically useful evaluation of whether the data processing unit operates correctly.

Since data processing units are very complicated, it is not possible to detect with complete certainty that the unit operates properly at a specific point of time. This examination must necessarily span a certain period of time during which the data processing unit performs a plurality of operations, and the decision whether the unit operates properly can only be taken with some probability.

Such test functions have e.g. been provided in that, at a predetermined location in the circuit, monitoring is established of the signal flow as a function of some applied input data, and then the signal flow is compared with the signal flow which would be correct in error-free operation. The German Patent Specification No. 3 225 712 discloses a process for detecting errors in a data processing unit, wherein a data word, generated by the data processing unit in response to a test function, is applied at suitable points of time, and this data word is compared in a comparator with information generated by a number generator with a predetermined number cycle. This known process is vitiated by several drawbacks, primarily that the result of each comparison arrives at the data processing unit with a certain time delay, which puts a serious limitation on the provision of test points in the test function. It will thus be appreciated that it is senseless that the data processing unit provides two data words to be compared with its own control information within a period of time shorter than the time delay associated with the comparison. Other drawbacks of the prior art are that it requires the use of a relatively complicated circuit to provide the control information, and also that the mentioned data words are generated on the basis of some operations in the unit to be tested, said operations being dependent upon some untested basic functions in the data processing unit.

The object of the invention is to provide a process of the type stated above, but which enables more rapid and flexible execution of a test function.

This object is achieved by performing a process in which a data processing unit produces first and second types of information. The first type of information updates a sequence network external to the data processing unit a plurality of times to provide a third type of information. The third type of information is then compared with other, predetermined information in response to the second type of information for a test function which monitors the data processing unit. Because the types of information are generated during the execution of the test function said first type of information being used outside the data processing unit to be tested to generate by means of a sequence network a third item of information to be compared with predetermined information, said comparison is controlled solely on the basis of the provision of the second type of information.

Since information of the first type may be called an "intermediate result", it will be appreciated that it is possible in the process of the invention to consider a large number of intermediate results which may be generated between two comparison operations, i.e. between two signals of the second type, at arbitrary points of time totally dependent upon when this is considered most appropriate in connection with the actual test function. Since the sequence network is external with respect to the data processing unit to be tested, it will be appreciated that it is not necessary, in the data processing unit, to use special micro instructions to generate the first type of information correctly. Preferably, the first type of information is generated from a memory in the data processing unit.

Performance of the process with digital signals and a counter provides a very simple and reliable method where the first type of information is represented by a single electric signal which is transferred to a counter circuit to up-date this. Thus, signal processing may be performed at a very great speed, and it is therefore natural to insert a large number of items of information of the first type between each comparison operation. It is particularly advantageous to perform the process wherein the test function may be said to be executed "rearwardly" with respect to what is normally defined by a program counter. This additionally reduces the risk of providing information in an error situation which cannot be detected as an error by the comparison operation.

Constant reference information can be used in a preferred embodiment. However, it will be appreciated that the reference information does not have to be constant, but may be exchanged in response to the generated test information, so that the process of the invention may also be used as a new and improved diagnosis tool.

The invention also concerns a data processing unit monitoring device having both a data processing unit as well as trouble-shooting means to execute a series of test functions. The data processing unit is characterized by the embodiment stated in the characterizing portion of claim 6. The said means are well-known and may be readily realized by a skilled person by means of commercially available components.

To improve the security against component faults, the troubleshooting means can be doubled and moreover designed to be updated in response to respective test functions. To improve the security additionally, the device then can operate properly only if correct comparison results are received from each of the two comparators (whose results are dependent upon the associated test program) within a predetermined period of time. It is noted that the sequence network may be updated by the first type of information repeatedly and at arbitrary points of time between two comparison operations.

A binary counter is used in a preferred embodiment of the data processing system monitoring device of the invention. It will be appreciated that such is not only inexpensive, but also relatively simple. To additionally improve the security firm coupling transfer may be used, so that the binary word of the counter, e.g., is not contained in any store cell that could fail.

Figure 4:
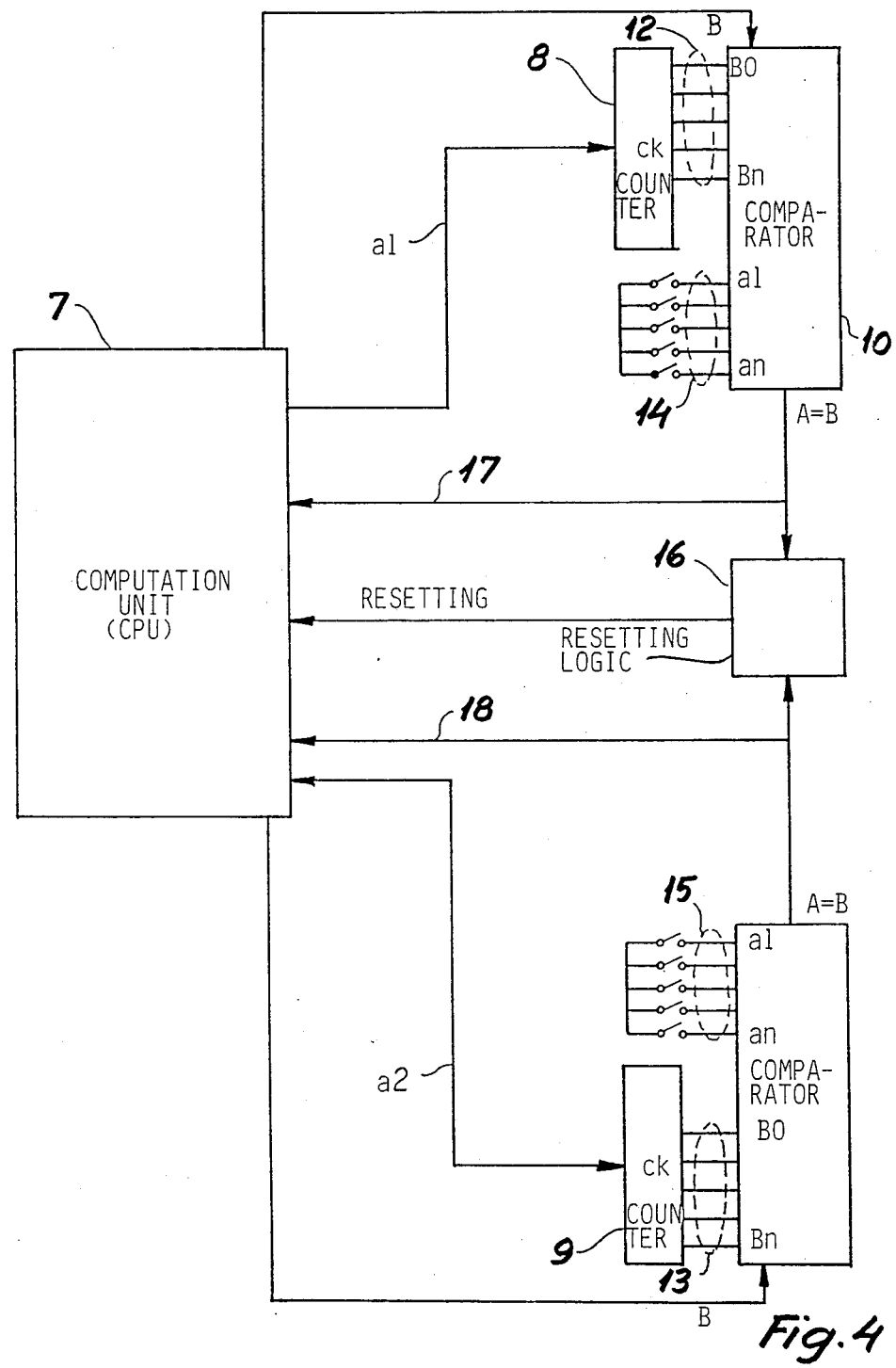
Figure 5:
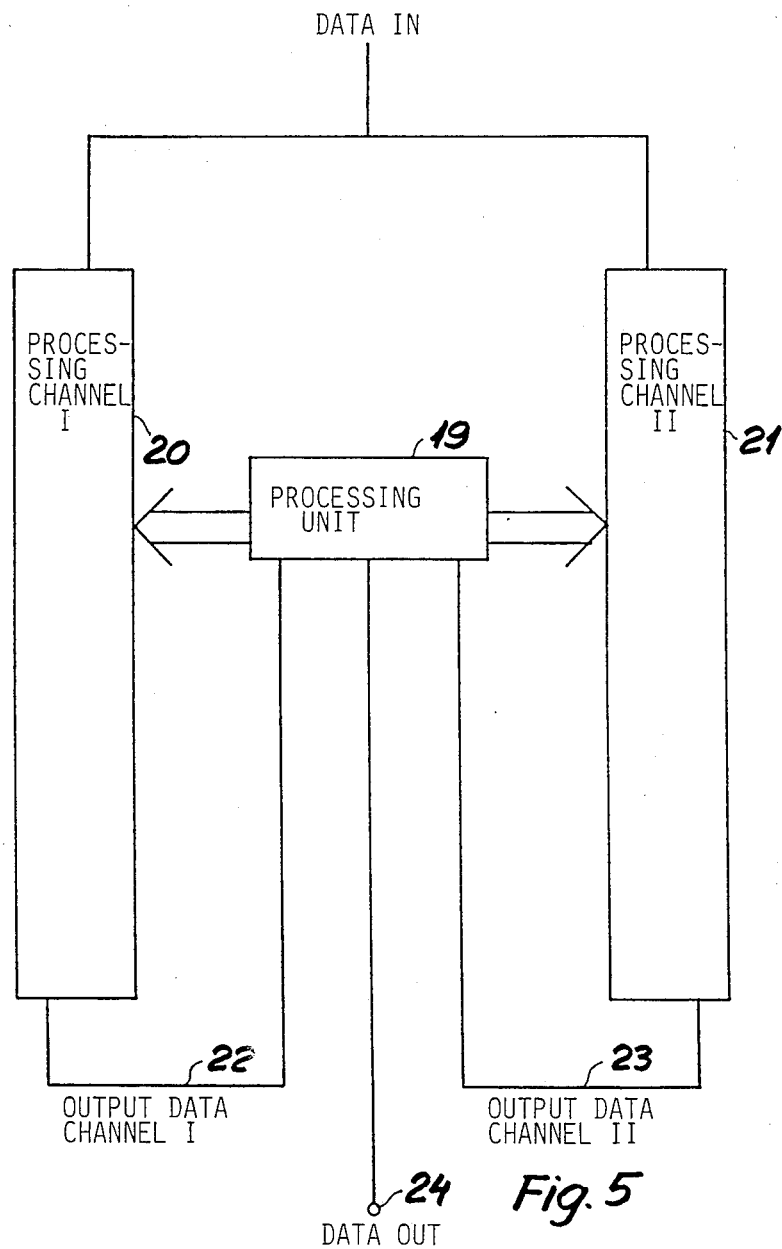
Figure 6:
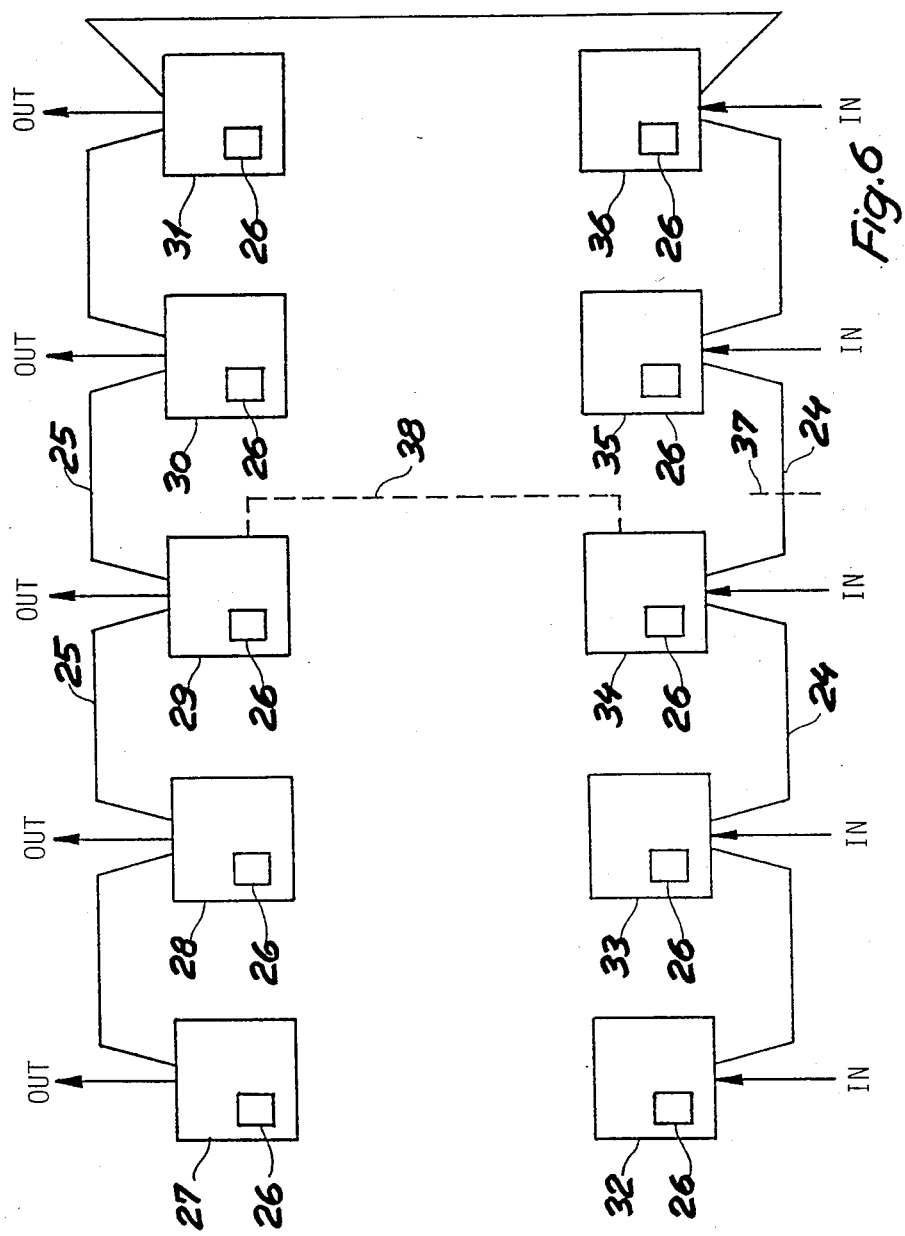

The invention will now be described more fully with reference to the drawing, in which FIG. 1 schematically shows how the execution of a test function may produce two types of information, FIG. 2 schematically shows how these types of information may be combined, FIGS. 3a and 3b show how the test functions are built according to a preferred embodiment, FIG. 4 schematically shows an apparatus for performing the process of claim 1, FIG. 5 schematically shows a signal processing unit in which the apparatus of the invention may be used to special advantage to control the signal processing in two parallel signal paths, FIG. 6 schematically shows a fibre-optical signal transmission system in which a data processing unit of the present invention may advantageously be used for controlling the signal processing.

It is a well-known problem in fail-safe data processing units to ensure that output data are correct. That output data are correct requires the input data and program to be correct and the data processing unit to operate properly.

The art includes a large number of methods to ensure that input data and program are correct, whereas it is considerably more difficult to determine that a processing unit operates properly.

To test the processing unit, certain requirements are of course necessary, which will be mentioned later, but it will be appreciated that the functional capability of the processing unit depends upon the execution of an instruction set or parts of it. Knowing that the instructions are executed properly, it is possible to assume that an error-free program will be executed correctly if it does not contain instructions other than those which have been tested.

With reference to FIG. 1, a test function is executed to test the instruction set of a processing unit or parts of it according to the invention in such a manner that a first type of information (A) is provided once or several times in response to how the test proceeds, and that a second type of information (B) is currently produced during the execution of the test function or at its completion, in response to which the first information (A) is compared with a predetermined item of information.

This process ensures that an error in the data processing unit is detected since the execution of a test function depends solely upon how the data processing unit executes the individual instructions. Faulty execution of an instruction will with certainty cause an error in the first type of information (A) because the first type of information (A) occurs in the execution of the instructions set. The error in the first type of information is detected when the second type of information (B) initiates comparison with the predetermined information. If this comparison should show inconsistency between the A information and the predetermined item of information, an error is detected. The detection of an error may be utilized for making the computing unit perform predetermined functions, which may e.g. be a repetition of the test sequence with a view to detecting whether it was a "real" error or an error of a transient type. Another possibility is to stop the function of the data processing unit instantaneously when an error is detected.

The said first type of information or A information may be produced in various ways, as will be explained below with reference to FIG. 2.

The A information may be formed by a pulse signal or be a predetermined or pre-established content in a store element, and this content is transferred for comparison with the predetermined information.

Another processing of the A and B information may be that the resulting A and B information is processed in combination units 1 and 2 designed to produce A' and B'\information by computation or combination operations, and this information is then used as described above for establishing whether the computing unit (7) operates properly.

With a view to improving the security of the test functions additionally, these are preferably divived into a plurality of sections 3, 4, 5 ..., nm, as shown in FIG. 3. A set of instructions is tested in each section, and the test starts in section 3 and jumps rearwardly to section nm in one or several steps.

If an error is detected during the test, the test function section is cut off in which the error is detected, and then the computing unit (7) performs an error routine (6) which serves to ensure that the recently detected error is recorded and processed correctly. If no errors are detected in a section, the test proceeds with a subsequent section where the instructions tested previously may now be used for testing other instructions, it being known that the instructions just tested function properly. Thus, when only tested functions are used for testing untested functions, it is ensured that the "input data" of the test are correct.

As appears from FIG. 3b, each test section is divided into at least three subsections. The first act in a test section n is that A information is provided. It is registered in this manner that the test has passed through this section. After the A information has been provided, one or more instructions are tested, it being an advantage in this respect, as stated before, that a plurality of tested instructions is already known. It is checked after the test of the instruction or instructions whether the result of the test is as expected. If the result is as expected, the test proceeds with the next test section. If, on the other hand, the result is not as expected, the error routine is executed.

It will thus be seen that only when all the sections of the test function have been run correctly, is the total correct A information provided, which upon provision of B information may be compared with the predetermined information. The "rearward" run of the sections of the test function shown in FIG. 3a and the layers 3f, 4f, 5f, ..., nmf, which are inserted between the test function sections and exclusively provide A information when run, ensures that errors in the computing unit (7), causing the test function to be run without the test function controlling the sequence, are detected in that the provided A information is wrong.

Such an error may e.g. manifest itself in running of the test function from "above", without performance of the jumps introduced in the test function. Thus, all the sections (3, 4, 5, ... nm) of the test function will be run, and the correct A information will be provided. However, the inserted layers (3f, 4f, 5f, ... nmf) of the A information will cause additional A information contributions to be provided. This makes the total A information wrong, and this is detected by subsequent comparison with the predetermined information, the comparison being performed when the B information is produced.

FIG. 4 shows a preferred embodiment of an apparatus for performing the process described above. The computing unit 7 performs a test function which, in this case, is divided into two test functions, each of which transmits A and B information.

In this preferred embodiment, the A information is a plurality of pulses transferred as A1 information and A2 information to the counters 8 and 9, respectively. The number contained in the counters 8 and 9 is transferred to one set of input terminals 12 and 13 on comparators 10 and 11 which are so designed that when B information occurs, which likewise consists of B1 and B2 information in the present embodiment, they compare the contents of the counters 8 and 9 with a number which is firmly coupled on the other set of input terminals 14 and 15 of the comparators 10 and 11.

A signal indicative of a comparison result is transferred for each of the comparators 10 and 11 to a reset logic circuit 16 designed to reset the computing unit if no signal from the comparators 10 and 11 arrives within a given period of time, which signal must express that the comparison of the A1 and A2 information with the predetermined information has had as its result that the items of information have been found to be consistent.

As appears from FIG. 4, the predetermined information supplied to the comparators 10 and 11 is firmly coupled to the input terminals 14 and 15 of the comparators. It is also possible to supply the comparators 10 and 11 with a predetermined item of information by reading-out this information from a store element. Read-out of reference informaton to the comparators 10 and 11 from a store element enables the use of various test functions. e.g. for seeking the cause of the failure of the computing unit 7, or the various types of reference information may be used in connection with various test functions testing various parts of the instruction set of the computing unit 7.

The test of the computing unit 7 described above makes it possible to determine with certainty whether the computing unit 7 operates properly. When it has been determined that the computing unit 7 operates properly at a given point of time, it is possible to perform fail-safe data processing. The fail-safe data processing may be performed by first letting the data processing unit 7 perform a computation. Then the computing unit 7 is tested. When it has been shown by this test that the computing unit 7 was error-free, the result just computed may be used, it being certain that the data processing unit 7 operated properly when it performed the computation that led to the result.

The test of the data processing unit is based on a comparison between the A information provided by the test function with a predetermined item of information. The two comparators 10 and 11 are used for this comparison. An error in these might have the result that even if there is a difference between the A information provided and the predetermined item of information, this difference is not detected. Therefore, the output signal from the comparators 10 and 11 is returned to the computing unit 7 over lines 17 and 18. The comparators 10 and 11 are tested in that the computing unit 7 transfers erroneous A information and transmits B information to the comparators, and then it is checked whether the comparators 10 and 11 provide the correct signal. The comparators are then to provide a signal which indicates that there is no consistency with the information on their two sets of input terminals (12, 14 and 13, 15), but if this signal is not provided, the computing unit 7 proceeds to perform an error routine which may have the same functions as described above. FIG. 5 shows a signal processing unit where the fail-safe computing unit is used for controlling the processing channels. Fail-safe comparators and two data processing units have previously been used in such processing units since it was possible to generate fail-safe comparators, but it was not possible to generate fail-safe data processing units. The fail-safe processing unit 19 controls the signal processing in two processing channels 20 and 21. Uniform input data are fed to the processing channels in a known manner, and then the output signals of the processing channels 20 and 21, unlike before, are not compared in a comparator, by recycled to the processing unit over lines 22 and 23 where they are compared. This recycling of the output signals to the processing unit 19 with a view to comparison is possible only because the data processing unit is fail-safe.

Since only one computing unit is used, the signal processing in the channels 20 and 21 does not take place synchronously. Transient noise will then only affect the processing of the signal in one channel, but the comparison of the output signals from the two signal processing channels 20 and 21 after the signal processing ensures that an errorneous signal is not passed on to the output 24 of the signal processing unit, since the comparison shows that the signal from the two processing channels 20 and 21 is not the same. If a difference between the two output signals is detected, it is possible to repeat the signal processing, during which a correct output signal will be produced, if there is no constant error in one of the processing channels 20 and 21. This structure of the signal processing unit excludes the possibility of transient noise affecting the output signal of the signal processing unit since transient noise only causes the signal processing to be repeated.

The use of one fail-safe data processing unit 19 for the control of two data processing channels 20 and 21 obviates the great problems of synchronization which are associated with having two data processing units controlling a current signal processing in two processing channels. When additionally using the fail-safe data processing unit 19 for comparing the output signal from the two data processing channels 20 and 21, the complicated fail-safe comparator may be omitted, which is otherwise normally used in such signal processing systems.

The use of a fail-safe data processing unit of the invention in a processing unit of the type described above involves additional advantages with respect to the use of known fail-safe data processing units. The data processing unit of the invention is tested in such a manner that the test sequence itself may be controlled to load the actual signal processing very little, while it is possible e.g. to concentrate the test on specially important processing sequences or to postpone tests to points of time where the data processing unit does not perform actual control of the processing channels. This flexibility makes it possible to use the data processing unit of the invention for many different control tasks where it is necessary that data processing and control take place in a fail-safe manner.

FIG. 6 schematically shows a signalling system which is composed of a plurality of receiver modules 37–31 and transmitter modules 32–36 associated in pairs. The transmitter modules convert data collected from the surroundings to "telegrams", which are transmitted over the optical fibre 24. The receiver modules serve to catch the mentioned "telegrams", which are transmitted over an optical fibre 25, and to convert these telegrams to output data, which can be further processed in the surrounding circuitry.

All modules incorporate a data processing unit 26 of the invention, and this data processing unit 26 serves a plurality of different purposes. These purposes may be collection of data, formation of "telegrams" and transmission of these, applying output signals, fail-safe data comparisons and reconfiguration of the signal transmission system in case of errors in the modules or ruptures of the optical fibres.

Rupture of one or more optical fibres causes the system to be divided into two or more subsystems so that the intact part of the system still operates. If e.g. a rupture occurs on the optical fibre 24 between the transmitter modules 34 and 35, a connection 38 is coupled between the receiver module 29 and the transmitter module 34. This divides the system into two subsystems operating independently of each other. The error is signaled simultaneously with this division so that steps may be taken to remedy it.

Since each individual one of the data processing units used in the system is fail-safe, and the system is designed to change configuration upon cable rupture or failure in the individual modules, this use of the data processing unit of the invention results in a fail-safe signal transmission system which may be used e.g. in railway safety systems.

We claim:

1. A process for monitoring a data processing unit, comprising: producing a first type of information and a second type of information in a data processing unit, for a test thereof; updating a sequence network external to the data processing unit with the first type of information a plurality of times to provide a third type of information, and comparing the third type of information and other, predetermined information in response to the second type of information for monitoring the data processing unit.

2. A process according to claim 1, comprising producing the first type of information from the content of a memory element associated with the date processing unit.

3. A process according to claim 1, wherein the first type of information is represented by digital signals, and the sequence network is a counter circuit.

4. A process according to claim 1, wherein, between two successive producings of the second type of information, at least two updatings of the sequence network are executed in an order reverse to the order determined automatically by a program counter.

5. A process according to claim 1, wherein the predetermined information is constant reference information.

6. A data processing unit monitoring device, comprising: a data processing unit comprising information means for producing a first type of information and a second type of information; and a first troubleshooting means external to the data processing unit, the first troubleshooting means comprising a sequence network for producing a third type of information in response to receipt of the first type of information from the data processing unit a plurality of times, comparator means, and transfer means for transferring the third type of information to the comparator means, the comparator means being for comparing the third type of information with other, predetermined information in response to receipt of the second type of information from the data processing unit, whereby to perform a test function.

7. A data processing unit monitoring device according to claim 6, and further comprising a second troubleshooting means like the first, both troubleshooting means receiving the first and second type of information for respective test functions.

8. A data processing unit monitoring device according to claim 7, wherein each of the comparator means produce a correct comparison signal when the third type of information and predetermined information correctly compare therein and further comprising a time responsive circuit for producing a signal indicating correct data processing unit function when the time responsive circuit receives the correct comparison signal from both of the comparator means within a predetermined period of time.

9. A data processing unit according to claim 6, wherein the first type of information is separate pulses, and the sequence network is a binary counter having a clock pulse input to receive the separate pulses.

10. A data processing unit according to claim 9, wherein the third type of information is a binary word, the transfer means comprises a firm coupling to an input terminal set of the comparator means, and the comparator means further comprises another input terminal set connected to an output of the binary counter.

* * * * *